United States Patent
Mirza et al.

(10) Patent No.: US 9,168,882 B1
(45) Date of Patent: Oct. 27, 2015

(54) METHOD AND APPARATUS FOR PROVIDING VEHICLE SENSOR DATA ACCESS AND STORAGE

(71) Applicant: Verizon Patent and Licensing Inc., Arlington, VA (US)

(72) Inventors: Momin Mirza, Santa Clara, CA (US); Yunji Fengshi, Guilderland, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/502,580

(22) Filed: Sep. 30, 2014

(51) Int. Cl.
 *B60R 16/037* (2006.01)
(52) U.S. Cl.
 CPC .................. *B60R 16/037* (2013.01)
(58) Field of Classification Search
 USPC .......................................... 701/117
 See application file for complete search history.

(56) References Cited

U.S. PATENT DOCUMENTS

| | | | | |
|---|---|---|---|---|
| 6,636,145 B1* | 10/2003 | Murakami et al. | ............. | 340/5.9 |
| 7,366,595 B1* | 4/2008 | Shimizu et al. | ............... | 701/301 |
| 7,737,866 B2* | 6/2010 | Wu et al. | .................... | 340/932.2 |
| 8,633,811 B2* | 1/2014 | Ikeda et al. | .................. | 340/441 |
| 8,773,285 B2* | 7/2014 | Yao et al. | .................... | 340/932.2 |
| 8,793,046 B2* | 7/2014 | Lombrozo et al. | ............. | 701/23 |
| 8,849,475 B1* | 9/2014 | Sudolsky et al. | ................ | 701/3 |
| 8,947,260 B2* | 2/2015 | Fukushima | ................ | 340/932.2 |
| 2011/0244919 A1* | 10/2011 | Aller et al. | ................. | 455/556.1 |
| 2012/0083960 A1* | 4/2012 | Zhu et al. | ........................ | 701/23 |
| 2013/0030645 A1* | 1/2013 | Divine et al. | .................. | 701/36 |
| 2013/0144459 A1* | 6/2013 | Ricci | ................................ | 701/1 |
| 2013/0222157 A1* | 8/2013 | Fukushima | ................ | 340/932.2 |
| 2014/0309838 A1* | 10/2014 | Ricci | .............................. | 701/25 |
| 2014/0309891 A1* | 10/2014 | Ricci | .............................. | 701/48 |
| 2015/0032401 A1* | 1/2015 | Nordbruch | .................... | 702/104 |

* cited by examiner

*Primary Examiner* — Thomas Tarcza
*Assistant Examiner* — Alex C Dunn (57) ABSTRACT

An approach for implementing a vehicle data exchange platform for identifying vehicle sensor data and providing methods for storage and exchange of the sensor data. The approach includes detecting a presence of a vehicle within a predetermined space, wherein the vehicle is configured with one or more sensors for collecting sensor data. The approach also includes configuring one or more sensor interfaces associated with the predetermined space to retrieve the sensor data from the one or more sensors, the vehicle, or a combination thereof. Further, the approach includes processing the sensor data to determine a storage location for the sensor data.

20 Claims, 9 Drawing Sheets

METHOD AND APPARATUS FOR PROVIDING VEHICLE SENSOR DATA ACCESS AND STORAGE

BACKGROUND INFORMATION

With the proliferation of sensors on vehicles and devices using media in vehicles, information collected as part of those vehicle sensors may be available for user application, as well as the consumption of a variety of content (e.g., programs, applications, media content, etc.). For example, a user may utilize the information collected by the sensors in their vehicle to adjust their driving style, to notify other of potential route issues, determine and notify of any issues/damage to the vehicle has occurred, etc. But also devices within the vehicle may be used to execute various computer programs, view videos (e.g., movies), listen to music, play video games, read literary works, or the like, etc. In various scenarios, over time, a user's vehicle may accumulate a large amount of vehicle data and media. For instance, a vehicle may store all its sensor readings over the course of its life, a user may purchase or download numerous video game programs for use on a game console in the vehicle, various productivity programs (e.g., for drawing, word processing, dictation, etc.), many movies for a vehicle display, music for vehicle sound system, or the like. This explosion in data collected from the vehicle sensors and growing use of vehicles as entertainment centers during travels has made the use and storage of that information very important to getting the most out of our vehicles.

Traditionally, cars only had certain sensors or timers for oil changes, tire pressure sensors, engine issue indicators (e.g., engine overheating), or very little data collected by sensors within the vehicle were stored on in the car. With the growth in creating more control over cars through onboard computers, the number of sensors has greatly increased thereby creating more efficient cars with better resource consumption and power exchange based on the capabilities of the engine. Although, storage of the data created by those sensors has not been limited by local storage, the additional need for more processing to make better data from the sensor data creates the need to transfer the data from the vehicle. Additionally, traditionally, only the most expensive cars had monitors to display movies and navigation, but as the expense for those parts has gone down, those devices are now becoming more ubiquitous in all cars. With the increase in use of cars as entertainment centers for travel, a need for increased storage space in the vehicle is needed.

Based on the foregoing, there is a need for providing an exchange of vehicle data.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A method, apparatus, and system for determining storage and transfer of vehicle data are described. In the following description, for the purposes of explanation, numerous specific details are set forth in order to provide a thorough understanding of the present invention.

In one embodiment, a system is needed for transferring sensor and media data to and from cars to best utilize the information provided by the sensors as well as increase the entertainment value of cars during travel. Without easily transferring the sensor and media data, users are unable to get the most out of their cars both as transportation and entertainment centers.

It is apparent, however, to one skilled in the art that the present invention may be practiced without these specific details or with an equivalent arrangement. In other instances, well-known structures and devices are shown in block diagram form in order to avoid unnecessarily obscuring the present invention. Further, the term "sensor data" is used to refer to data collected by sensors as well as applications, programs, media contents, or similar software that may be executed, utilized, consumed, or accessed via a user vehicle. The sensor data may be stored locally on the vehicle or at a remote storage device which may be accessible by the vehicle. Furthermore, the terms "sensor data," "vehicle sensor data," "media data," and "vehicle data" may be used interchangeably to refer to data which may be collected or used by a vehicle or device within a vehicle. The terms "network adapter," "communication port," and "communication adapter," may be used interchangeably to refer to a communication device use by the vehicle to communicate with the predetermined location, whether it be wired or wireless using various network or communication adapters and protocols such as Bluetooth®, Ethernet, wireless fidelity (WiFi), etc. The term "sensor interface" refers to the communication device located at the predetermined location which communicates with the vehicle to receive sensor data. The terms, "wireless adapter," "wireless antenna" and "wireless radio" may be used interchangeably to refer to a vehicle's wireless antenna or device within a vehicle which may broadcast and receive wireless signals. The terms, "predetermined location" and "predetermined space" may be used interchangeable to refer to the location where the detection of a vehicle is activated.

Figure 1:
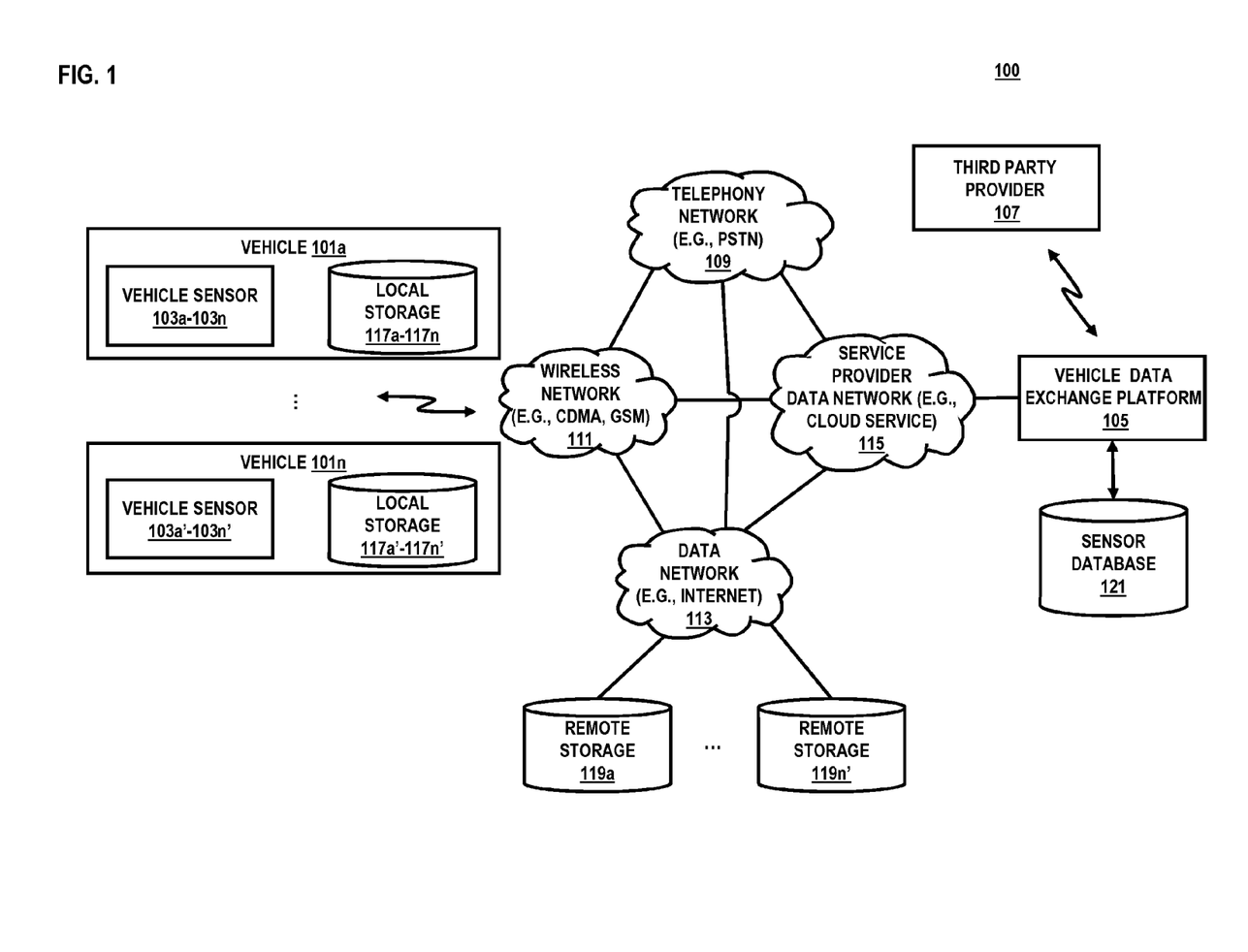
FIG. 1 is a diagram of a system capable of exchange of vehicle data, according to one embodiment.

FIG. 1 is a diagram of a system capable of exchange of vehicle data, according to one embodiment. In general, vehicles new and old contain different sensors and different entertainment devices which may or may not be used by the user of the vehicle. Each vehicle may have different sensors and different entertainment devices, but all of these devices and sensors will need storage for retained data. New vehicles contain many devices, such as, liquid crystal displays (LCD) displays for video content playback, real-time vehicle camera viewing, global positioning satellite (GPS) navigation, other media selection and playback; but also many different types of sensors for gathering data about the vehicle tire inflation, engine statistics and issues, vehicle speed, temperature, rain density, etc. For example, a user of the vehicle may only see occasional indicators of issues with the vehicle while much of the remaining data is unused, but the vehicle is continually collecting data and continues to store not only the gathered data, but data for media a user wants to keep on the vehicle.

Therefore, there is a need for a capability of determining what sensor data there is along with where to store the sensor data.

To address these issues, system 100 of FIG. 1 provides the capability for determining what sensor data there is along with where to store the sensor data. As previously discussed, in some situations, vehicles may have different sensors and media playback devices. In other situations, the vehicles may have limited communication connectivity or sensor interfaces. In other situations, vehicles may have many different users which may be used to determine whether sensor data or media are stored locally on the vehicle or remotely. In some instances, a user may choose to transfer and store data to the places of their selection. In some scenarios, data may be pushed to the vehicle, e.g., content provider advertisements. In other scenarios, the data may be presented directly to users of the vehicle or applied to various applications on the vehicle, e.g., accident/traffic reports applied to GPS navigation systems, used in determining alternate routes.

In one embodiment, the one or more networks 109-115 may include various components and elements for providing a range of communication and network services. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109, 111, 113, and 115 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that networks 109, 111, 113, and 115 may include components and facilities to provide for signaling and/or bearer communications between the various components or facilities of system 100. In this manner, networks 109, 111, 113, and 115 may embody or include portions of a signaling system 7 (SS7) network, or other suitable infrastructure to support control and signaling functions.

In one embodiment, the sensor database 121 may include information related to vehicles and their associated functionalities and sensors. For example, the sensor database 121 may include information related to the type of vehicle, sensors associated with the vehicle, communication method/type as well as communication port location(s), images of the vehicle, related user information, storage location of data, as well as all data associated with the vehicle.

The sensor database 121 may be implemented by using any known or developing proprietary or open source technologies. The sensor database 121 may allow the definition, creation, querying, update, and administration of information or data stored therein. The sensor database 121 may also be located locally or remotely with respect to the vehicle data exchange (VDE) platform 105. In one embodiment, the sensor database 121 may include a distributed database.

In one embodiment, the third party providers 107 may provide media or other data for use with vehicle data, for example, law enforcement agency access to location identifiers of the vehicle or advertiser access for pushing media to the vehicle. The third party providers 107 may include user interfaces, devices, systems and methods provided by a service provider to allow parties not actually participating in the exchange and storage of the vehicle data to access data, information, services offered by the system 100.

In one embodiment, a user may subscribe to services provided by a VDE platform 105, wherein user profile, user preferences, or the like information may be utilized by the VDE platform 105 to provide recommendations, options, offers, or the like that may be available for vehicle data exchange associated with the user. For example, user information may indicate storage associated with the user, vehicles associated with the user, communication types associated with the user, user preferences with respect to different sensor data, media, or the like.

In one embodiment, the user may be associated with a specific library of data or media which may be transferred or stored. For example, a user may setup a storage location (e.g., remote or locally on the vehicle) where vehicle sensor data is generally stored (e.g., locally on the vehicle) and where media is generally stored (e.g., remotely stored within the users' home or other storage location such as a cloud).

In some embodiments, a vehicle 101a-101n may be any mode of transportation including automobiles, buses, trains, trucks, planes, boats, etc. The vehicle is detected within a predetermined space and the VDE platform 105 is initiated. In some embodiments, a predetermined space may include a garage, an intersection, a marked or unmarked location, an area surrounding a specified place, etc. In some embodiments, VDE platform 105 determines sensors 103a-103n and 103a'-103n' which may be defined by vehicle information or user input as found in sensor database 121 or third party provider 107 databases. The sensors 103 may include a pressure gauge, temperature sensor, cameras, microphone, GPS, use of communication services, and other vehicle maintenance and troubleshooting sensors, etc. In some embodiments, the sensors 103 produce related data such as vehicle location, tire pressure level, engine power consumption, gas mileage indication, gas level, battery level, engine temperature level, environmental temperature level, etc. In some embodiments, the vehicle 101 may include multiple communication methods, in others, the vehicle may only include one communication method; communication methods may include wired and/or wireless communications of all types. In some embodiments, the vehicle 101 may also contain local storage 117a-117n and 117a'-117n'.

The local storage 117 may be a part of the vehicle sensors 103 or a separately connected part of the vehicle 101. In one embodiment, vehicle information may be stored in the local storage 117. In one embodiment, the local storage 117 is any type of storage capable of holding and enabling retrieval, storage, and updating of any data or information. In one embodiment, the local storage 117 may store one or more videos and one or more images captured by the cameras 101. The local storage 117 may be implemented as a file system or a database system or a combination thereof. The local storage 117 may include a variety of storage units implemented using a variety of technologies. The local storage 117 may be implemented as a distributed database. In one embodiment, the local storage 117 may include cloud storage accessible by the vehicle communication. In another embodiment, the local storage 117 may include discrete storage units for each sensor 103 associated with the vehicle. In one contemplated embodiment, local storage 117 may be implemented in part on the sensors 103 or in part on the cloud storage (not shown).

In one embodiment, a VDE platform 105 may interact with a vehicle 101 to detect the presence of the vehicle within a predetermined space, wherein the vehicle is configured with one or more sensors for collecting sensor data. For example, a VDE platform 105 may be able to detect the presence of a vehicle 101 with sensors surrounding the predetermined space such as pressure sensors, cameras, GPS, near-field communications (NFC) or other communication method (e.g., Bluetooth), etc. In one embodiment, the VDE platform 105 may be able to detect the presence of a vehicle based on contextual indicators, e.g., a user's personal schedule.

In one embodiment, a VDE platform 105 may interact with a vehicle 101 to determine additional storage options from the local storage 117. These additional storage options may include remote storage 119a-119n. The remote storage 119 may be located at the predetermined location, but may also include remote storage within a user's home or within a radius of the predetermined location. In one embodiment, vehicle information may be stored in the remote storage 119. In one embodiment, the remote storage 119 is any type of storage capable of holding and enabling retrieval, storage, and updating of any data or information. In one embodiment, the remote storage 119 may store one or more videos and one or more images captured by the cameras 101. The remote storage 119 may be implemented as a file system or a database system or a combination thereof. The remote storage 119 may include a variety of storage units implemented using a variety of technologies. The remote storage 119 may be implemented as a distributed database. In one embodiment, the remote storage 119 may include cloud storage. In one contemplated embodiment, local storage 117 may be implemented in part on the sensors 103 or in part on a cloud storage (not shown).

In one embodiment, a user may initiate a request for exchange based on a specific sensor for a specific vehicle. The user may also select storage location or application of use. The application may be used to analyze further the sensor data to be processed further so more pertinent information may be obtained from the data.

Figure 2:
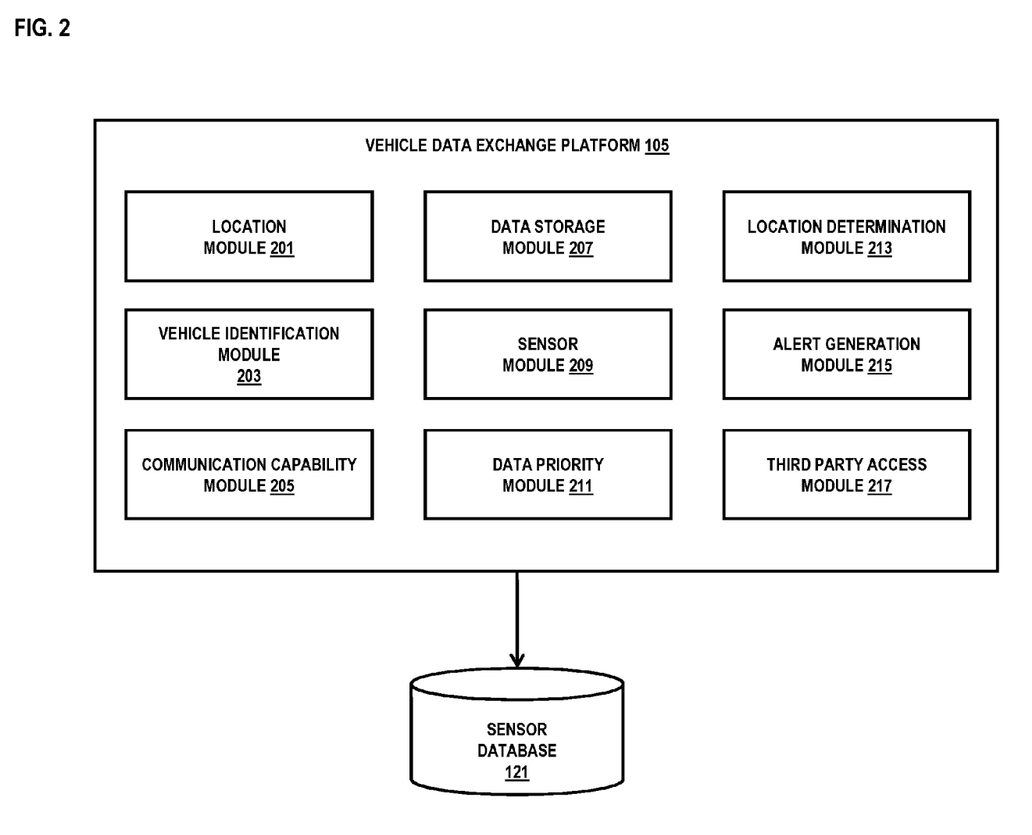
FIG. 2 is a diagram of the components of a vehicle data exchange platform, according to one embodiment.

FIG. 2 is a diagram of the components of a vehicle data exchange platform, according to one embodiment. The VDE platform 105 includes various executable modules for performing one or more computing, data processing and network based instructions that in combination provide a means of identifying assets associated with a user and providing recommendations to exchange the assets. Such modules can be implemented in hardware, firmware, software, or a combination thereof. In one embodiment, the VDE platform 105 may include a location module 201, vehicle identification module 203, communication capability module 205, data storage module 207, sensor module 209, data priority module 211, location determination module 213, an alert generation module 215, and a third party access module 217. In addition, the VDE platform 105 may have access to or maintain a sensor database 121 and third party providers 107 wherein information may be requested or received from one or more third party providers.

In one embodiment, the location module 201 detects the presence of a vehicle with sensors within a predetermined location. The predetermined location may be an intersection, a parking spot, a garage, repair bay, or any other proximity of a defined location. The detection may be by pressure sensors or pads in the predetermined location, surveillance camera, wireless communications, GPS location of the vehicle, or even based on user contextual information, e.g., a user's calendar events. In one embodiment, the location module 201 may communicate with the sensor database 121 to determine what sensors are at a predetermined location as well as determine what capabilities sensors at a predetermined location have.

In one embodiment, the vehicle identification module 203 may use the vehicle presence detection information to identify a vehicle, e.g., use surveillance camera footage with image processing to identify exactly what vehicle is at the predetermined location. The image processing may entail identifying key features of a vehicle such as shapes of identified parts, recognizing vehicle identifiers such as license plate numbers, etc. In one embodiment, the vehicle identification module 203 may use knowledge of communication identifiers (e.g., MAC address, Bluetooth identifier, other user device/vehicle identifier, etc.) or contextual information such as knowledge of user schedules such as a user being at work or at home. In one embodiment, the vehicle identification module 203 may communicate with the sensor database 121 to determine user inputted vehicle information, determine key identifying features for various vehicles, e.g., shape, size, weight, engine sound, etc. of vehicles, as well as combinations of specific identifying features, e.g., the combined identification of the shape and size of headlights, rear bumper, and windshield. In one embodiment, the vehicle identification module 203, may communicate with third party providers 107 to retrieve additional information, update vehicle identifier information, and/or search for additional information, e.g., searching DMV vehicle databases or requesting information from vehicle manufacturers with regard to vehicle specifications. In one embodiment, the vehicle identification module 203 may also use micro-location information to determine the vehicle identification.

Figure 6:
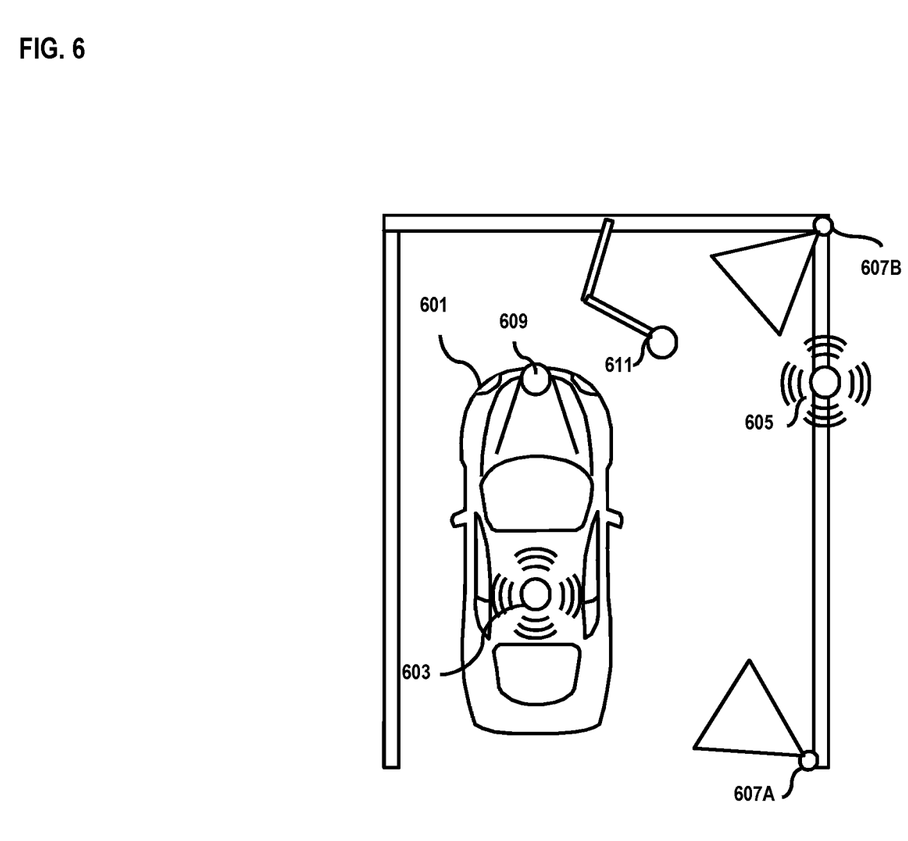
FIG. 6 is a diagram of a predetermined space along with the vehicle configured with one or more sensors, according to various embodiments.

In one embodiment, the communication capacity module 205 determines the communication method used by the vehicle as well as the capabilities, e.g., upload/download speed, of the communication method. The determination of communication method and capability may be through the vehicle identification information, but may also be through testing the upload/download speed of the communication method for the vehicle. The communication method may be wired or wireless and may include one or more communication methods in combination as well as one or more communication connections, e.g., multiple wireless or wired communication adapters. In one embodiment, the communication capacity module 205 may communicate with the sensor database 121 to determine communication capabilities of identified vehicles. In one embodiment, the communication capacity module 205 may also determine communication capability by determining the positioning of the vehicle and thus location of the vehicle communication adapters with respect to the communication adapters of the predetermined location, e.g., sensor interface(s), as illustrated by FIG. 6. The communication capacity module 205 may also be able to optimize the communication capabilities based on knowledge of the positioning of the vehicle with respect to the communication adapters of the predetermined location. In one embodiment, the communication capacity module 205 may actuate the placement of a sensor interface based on the signal strength from the vehicle wireless communication adapter. In one embodiment, the communication capacity module 205 may automatically attach a wired communication adapter to the vehicle's wired communication port. The communication capacity module may attach the wired network adapter with the use of a robotic actuating arm or other remotely controlled object with the ability to attach the wired communication adapter to the vehicle's wired communication port, as illustrated by FIG. 6. In one embodiment, the wired communication adapter may also be removed by the same means. In one embodiment, the communication capacity module 205 determines the location of the vehicle's wired communication port by determining the positioning of the vehicle.

In one embodiment, the data storage module 207 determines storage associated with a user of the identified vehicle, storage associated with the identified vehicle, storage associated with a sensor or media data, and storage associated with the predetermined location. The storage may include remote storage 119, e.g., storage not located on the vehicle or on a vehicle's sensors, or local storage 117, e.g., storage located on the vehicle or one the vehicle's sensors. In one embodiment, the data storage module 207 may operate in connection with the communication capability module 205 to determine where a sensor or media data should be stored based on the communication abilities of the vehicle. The upload/download speed, traffic on the network, network capabilities, etc. may all be factors in the decision to store sensor data remotely or locally. Additionally, in other embodiments, user preference, storage capabilities (e.g., free space, storage ability such as read/write speed, storage reliability, etc.), and/or data type/size may be factors in the decision to store sensor data remotely or locally. Various data types may include sensor data which receives preferential treatment to other sensor data, e.g., vehicle warnings, travel reports, etc. In one embodiment, the data storage module 207 may communicate with the sensor database 121 to determine storage capabilities, local storage 117, and potential remote storage 119 locations, along with the storage capabilities of each local and/or remote storage.

In one embodiment, the sensor module 209 determines which sensors are associated with the identified vehicle. This determination may include determination based on vehicle type (e.g. make, model, year, etc.), user input, or known vehicle updates/upgrades. The sensor module 209 may also determine sensor capabilities (e.g., detection of humidity, temperature, geo-location, biometric data of the user, surrounding circumstance such as other vehicles or events external to the vehicle, vehicle status and statistics, etc.), sensor data types associated with the sensors, along with determine locations for storage of the sensor data by operating in connection with the data storage module 207 and location determination module 213. In one embodiment, sensors may include microphones, optical sensors (e.g., video cameras), Bluetooth®, NFC, GPS, accelerometers, gyroscopes, thermometers, etc.) that may, in addition to their primary functions, be used to determine environmental (e.g., atmospheric) conditions surrounding the vehicle, user mood, location information, and various other information from a range sensors that may be available on one or more devices.

In one embodiment, the data priority module 211 determines a priority for the vehicle sensor and media data. The data priority module 211 may factor communication capability, data storage capability, data importance and sensitivity, user preferences, etc. in determining where the data will be stored or transferred. Additionally, the data priority module 211 may determine whether to synchronize the data with other vehicles, e.g., traffic and accident information. In one embodiment, the data priority module 211 may also determine whether to purge, keep or backup vehicle sensor and media data based on the above factors. For example, should the data importance be high a backup may be made among several remote storage facilities or between local and remote storage facilities; should the data be highly sensitive the data may be purged from both local and remote storage facilities; and should the data be valuable only to the vehicle itself, without remote processing (e.g., processing of the data outside the vehicle), then the data may be kept locally and stored over a predetermined time, as long as there is space within the local storage.

In one embodiment, the location determination module 213 determines where to store, keep, backup, synchronize or purge the vehicle sensor and media data, whether remotely or locally, this determination may be based on storage capability, communication capability, and/or data priority associated with the vehicle, the predetermination location, the vehicle sensors, the storage, and/or the communication adapter(s) of the predetermined location. Once, the location determination module 213 has determined where to store, keep, backup, synchronize or purge the vehicle sensor and media data, the location determination module 213 may be communicate with the sensor database 121 to update, add, or remove various data storage location entries.

In one embodiment, the location determination module 213 may communicate with remote storage 119 to deliver vehicle sensor and media data to the vehicle for consumption by users of the vehicle, e.g., a remote storage located in a garage sending media content to the vehicle for users to watch. In other embodiments, the location determination module 213 may deliver vehicle sensor and media data to the vehicle based on, at least in part, on user identification, vehicle sensor and media playback devices, navigation information (e.g., journey length/time or likelihood of traffic), etc. In one embodiment, the location determination module 213 may deliver sensor and media data from the vehicle to another proximate vehicle, e.g., sharing content peer-to-peer.

In one embodiment, the alert generation module 215 may be coupled with various communication devices to alert known associated users of the vehicle of any potential issues, e.g., bad traffic on their predetermined navigation route, low tire pressure, engine malfunctions, the need for maintenance of the vehicle, low energy (e.g., gas and/or battery power), etc. The alert generation module 213 may alert users through associated user devices (e.g., cellular phone, laptop, tablet, etc.), user interface devices associated with the vehicle (e.g., vehicle displays), or other communication protocol (e.g., email, text message, alert applications, etc.). The alert generation module 213 may operate in connection with the data priority module 213 to alert users based on varying levels of data priority. In other embodiments, the alerts may be received as images, video, audio, text, etc.

In one embodiment, the third party access module 217 allows third parties access to local and remote storage. In one embodiment, the user is provided notification with selective choice of sending, receiving or denying sensor and/or media data. In one embodiment, the user may select preference of the right to send, receive or deny sensor and/or media data from third parties. In one embodiment, the third party access module 217 may push sensor and/or media data to the vehicle based on the predetermined location, communication capability and storage capability, e.g. pushing advertisements for a nearby restaurant to the user interface of the vehicle.

In one embodiment, the third party access module 217 may determine a user's identity through associated users of the identified vehicle. The user identity may then determine whether the user is a subscriber through communications with the third party provider 107 or with contextual information, e.g., driven routes. The subscriber determination may then be used to determine whether to send or retrieve media, e.g., video, games, music, images, or text, with the vehicle for display in the vehicle's onboard display(s). In one embodiment, should the media file take longer to send to the vehicle than the time spent at a predetermined location the file may be separated into smaller partitions to be sent the vehicle at each predetermined location the vehicle passes through, e.g., along the vehicle's navigation route.

Figure 3:
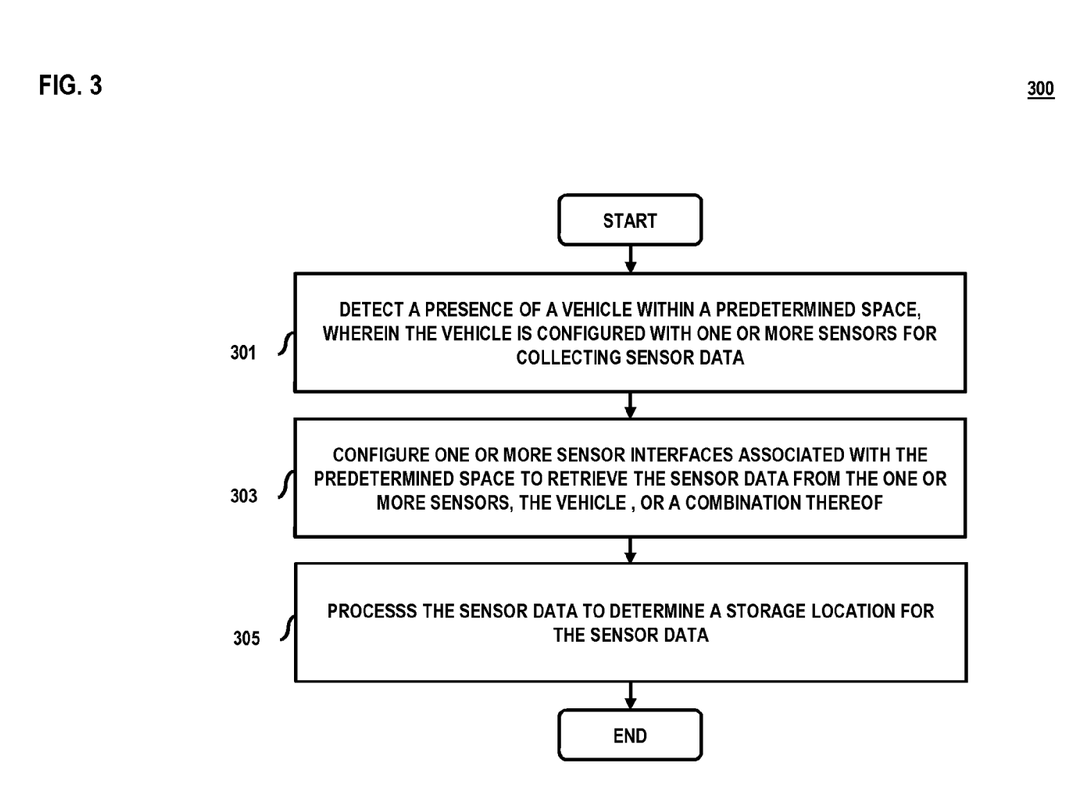
FIGS. 3-5 are flowcharts of processes for the use of a vehicle data exchange platform, according to various embodiments.
Figure 4:
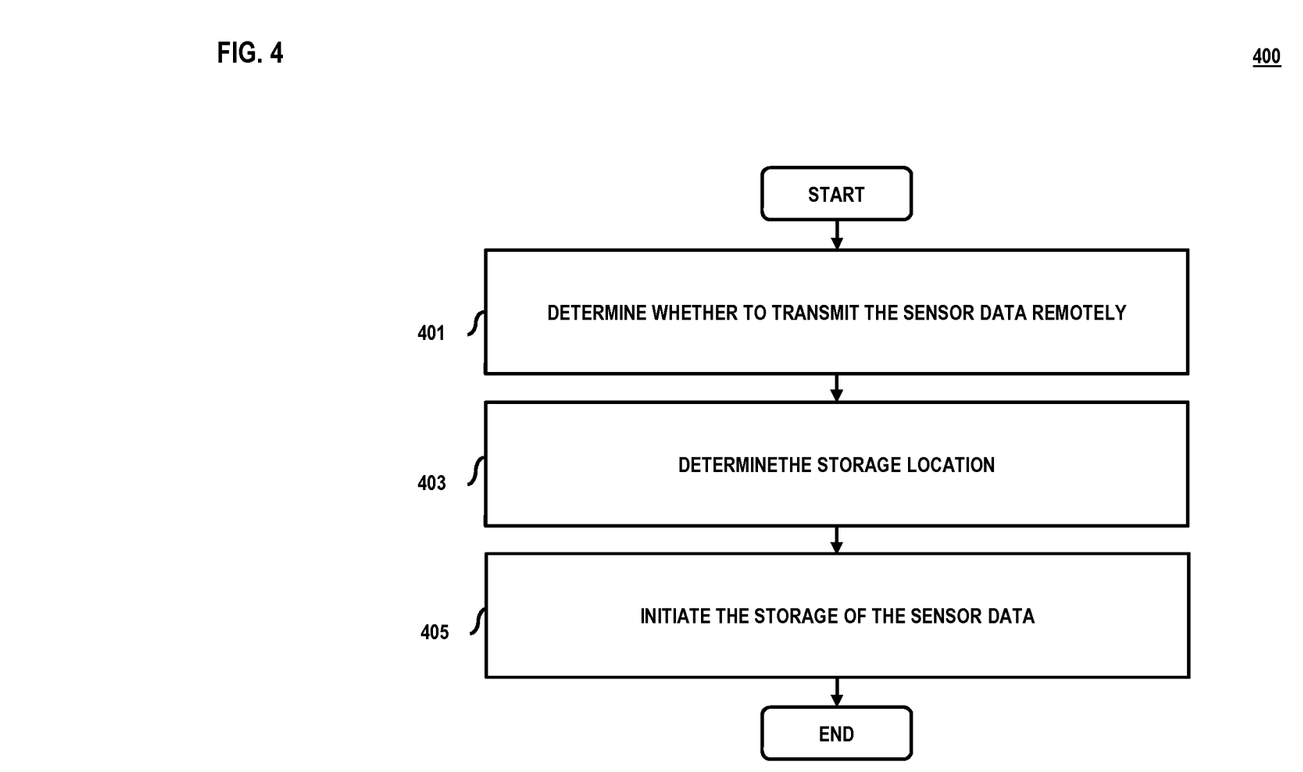
Figure 5:
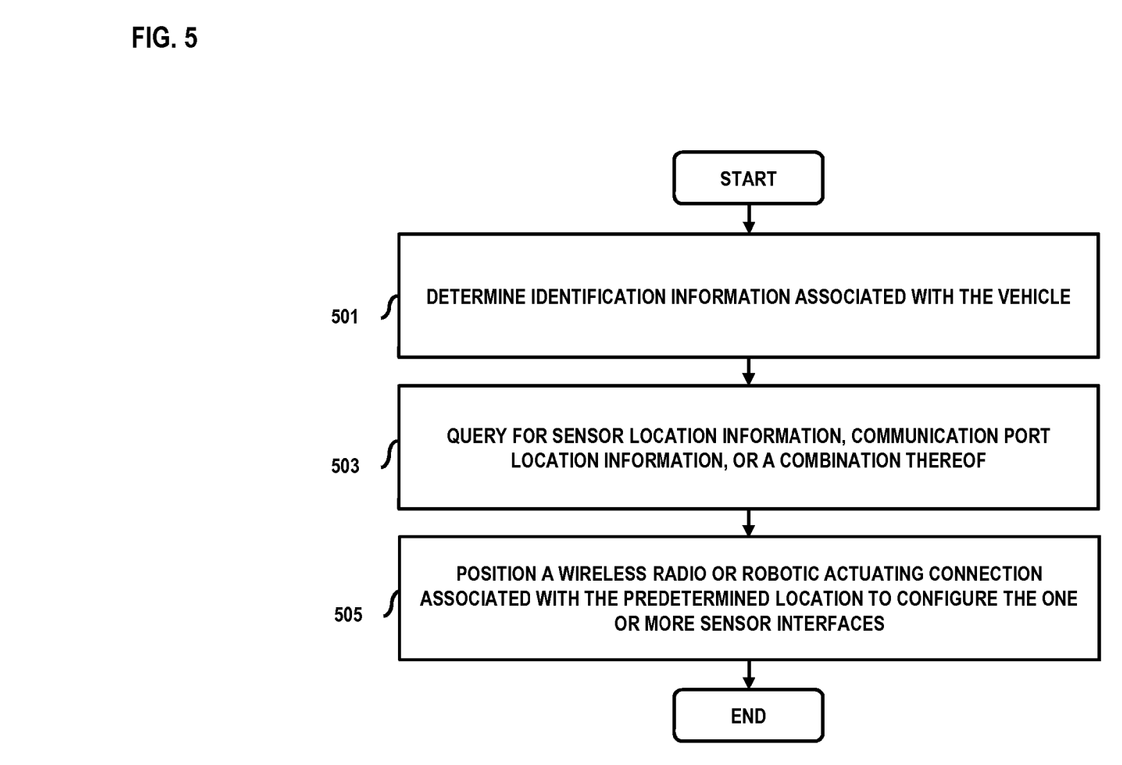

FIGS. 3-5 are flowcharts of processes for the use of a vehicle data exchange platform, according to various embodiments. It is noted that the steps of processes 300, 400, and 500 may be performed in any suitable order as well as combined or separated in any suitable manner. Further, all or portions of the steps or the processes may be initiated or completed by any of the components of the system 100, for example, by a VDE platform 105. However, for clarity in discussing the processes, the VDE platform 105 is referred to as completing various steps of said processes, which may be performed in any suitable order and where one or more of the steps may be optional.

Referring to FIG. 3, in step 301, the VDE platform 105 may detect a presence of a vehicle within a predetermined space, wherein the vehicle is configured with one or more sensors for collecting sensor data. In one embodiment, the predetermined space may be configured with a network of cameras, other sensors (e.g., pressure sensor), and/or communication devices and protocols for identifying a vehicle is within the predetermined space. For example, a vehicle may be identified by its assigned communication hardware address (e.g., MAC address) in conjunction with a known variable weight for the vehicle. In one embodiment, the vehicle may be identified based on compiled image processing of multiple viewpoints from a network of cameras. One or more of the viewpoints may be used to determine the positioning of the vehicle within the viewed, predetermined location.

In step 303, the VDE platform 105 may configure one or more sensor interfaces associated with the predetermined space to retrieve the sensor data from the one or more sensors, the vehicle, or a combination thereof. In one embodiment, the sensor interface may communicate with the vehicle communication adapter(s) to retrieve, synchronize, purge, backup, etc. the sensor and media data from the one or more sensors of the vehicle. The local storage 117 containing the sensor and media data from the vehicle may copy, delete, and/or send, the sensor and media data based on the data priority and detail. In one embodiment, the VDE platform 105 may also request only certain periods of data be collected for certain data types. For example, tire pressure data every minute versus engine efficiency or usage data every second. In one embodiment, the vehicle sensors may collect with greater frequency should an event be recognized, for example, the swerving of the vehicle may result in engine and tire pressure data collection increasing from one data point per second or minute to one data point per hundredth of a second.

In step 305, the VDE platform 105 may process the sensor data to determine a storage location for the sensor data. In one embodiment, the processing of the sensor data may involve prioritizing the data based on value to the user as opposed to value to the vehicle. The processing may of the prioritization may also involve communication capabilities, storage capabilities, or combination thereof. For example, should remote storage or local storage have limited free space, the sensor data may be prioritized to only send extremely important sensor data such as urgent vehicle issues or navigation route notifications to the remote storage and alert the user. In other examples, should the sensor interface, in one predetermined location, be not as stable or not as efficient as another predetermined location on a vehicle's navigated route (where more than one predetermined locations exist), larger data files such as video or media, may be transferred to local storage only at the more stable communication location. Smaller data files may be transferred at the first unstable location. In one embodiment, the storage of the sensor data may be determined by the data itself. For example, if post processing of data by a remote source (e.g., a computer calculating maintenance or performance statistics of a vehicle) determines the data more valuable than originally anticipated more data may be requested from the vehicle with regards to the sensor data. In another example, the data may have little value to the vehicle without post processing by other devices. In that case, the data would generally be prioritized to be copied or transferred to remote storage to be processed and evaluated. These priorities may be previously set by a vehicle user or may be determined based on value of the data to a user as well as the storage capacity and communication capacity of the predetermined location and vehicle. Additionally, for example, when a vehicle local storage is nearing full, the VDE platform 105 may determine to remove, from the local storage, only sensor and/or media data prior to the last four weeks and continue to store locally all new sensor and/or media data.

Referring to FIG. 4, in step 401, the VDE platform 105 may determine whether to transmit the sensor data remotely. In one embodiment, the VDE platform 105 may determine to transmit the sensor and/or media data based on communication capability, storage capability, needed data processing, or combination thereof. The sensor data may be determined to be sent based on high communication capacity at a predetermined location and/or lack of free storage capacity at the vehicle. For example, should a vehicle lack storage capacity and have wireless data service, sensor and/or media data may be stored remotely on a cloud and streamed to the vehicle as needed. In one embodiment, the VDE platform 105 may determine to keeping, remove, backup, synchronization, or updating the sensor and/or media data for which only backup, synchronization and updating may require transmittal of the sensor data.

In step 403, the VDE platform 105 may determine the storage location. In one embodiment, once determined to be transmitted, the VDE platform 105 may determine the remote storage location of the sensor data. This determination may be based on storage capacity, security, and stability of each remote storage location as well as data type. For example, a more secure remote storage should store more sensitive sensor and media data such as GPS navigation route tracking, or a remote storage with greater storage capacity may store larger files such as media data.

In step 405, the VDE platform 105 may initiate the storage of the sensor data. Once the storage location is determined, the VDE platform 105 may then initiate the transmittal of various parts or all of the sensor data from the vehicle to the determined storage location.

Referring to FIG. 5, in step 501, the VDE platform 105 may determine identification information associated with the vehicle. In one embodiment, the VDE platform 105 may use information from the sensor database 121 to retrieve information regarding the context of use of the vehicle (e.g., user schedule), shapes, size, sound, and/or weight of the vehicle, as well as updated information from third party providers 107. The sensors and communication protocols at a predetermined location may all contribute to determining the identity of the vehicle. For example, partially known vehicle license plates retrieved from an image of the vehicle may be combined with color, type, and any known modifications of the vehicle to determine that the vehicle is identified as x user's vehicle.

In step 503, the VDE platform 105 may query for sensor location information, communication port location information, or a combination thereof. In one embodiment, once the vehicle is identified, an inquiry can be made directly to the vehicle, third party provider, or user of the vehicle with regards to knowledge of vehicle sensors and their locations, and/or knowledge of communication adapter locations and capabilities, should they be unknown. The information may be retrieved from the local storage 117. In one embodiment, the positioning of the vehicle within the predetermined location may be determined by the sensors in the predetermined location, this base information about the vehicle positioning may then be used to determine the exact location of communication ports and sensors.

In step 505, the VDE platform 105 may position a wireless radio or robotic actuating connection associated with the predetermined location to configure the one or more sensor interfaces. In one embodiment, the sensor interfaces may be configured to best utilize wireless radio locations as well as wired connections using the robotic actuating connections. This may be best illustrated by FIG. 6. In one embodiment, a wireless radio and/or robotic actuating connection use to accept transmittal of the transmitted sensor data may be re-positioned to best connect physically or wirelessly to the vehicle communication port.

FIG. 6 is a diagram of a predetermined space along with the vehicle configured with one or more sensors, according to various embodiments. In one embodiment the predetermined space is seen as a parking location or garage which contains a vehicle 601 parked. The vehicle has both a wireless radio 603 as well as a wired communication port 609. Either or both of which may be used to transfer sensor and media data. The predetermined location comprises multiple sensors including cameras 607A and 607B whose viewpoints may be superimposed to create a 3D image, its location and potentially any damage to the exterior of the vehicle 601, and whose images may be also used to determine key identifying factors regarding the vehicle 601. Based on the location determination by the cameras' 607 images, the VDE platform 105 may determine the exact location of communication port 609. Thus, actuating arm 611 may be moved to connect to communication port 609 and create a wired connection between the vehicle and any remote storage. Furthermore, the sensor interface 605 may be moved throughout the predetermined location to achieve the best possible signal strength and stability from the wireless radio 603. The sensor interface 605 may also be used to wirelessly communicate with the wireless radio 603 of the vehicle 601. In one embodiment, both the wired and wireless communication connections may be used at the same time to increase the sensor and/or media data transmittal rate.

Figure 7:
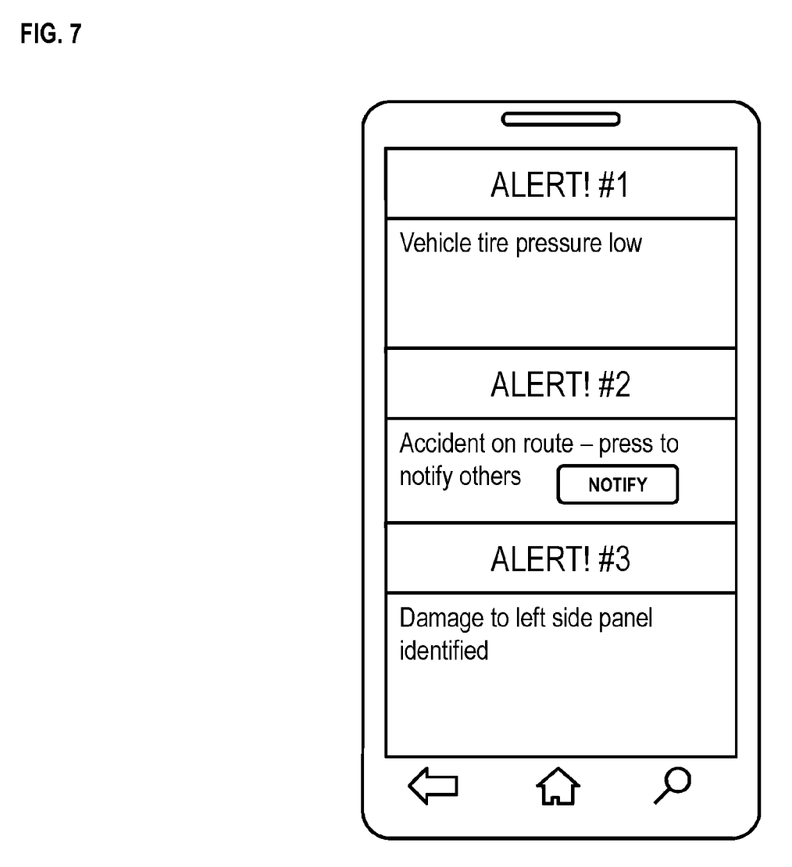
FIG. 7 is a diagram of a user interface for use in important notices to the user of the vehicle or other users of related vehicles, according to various embodiments.

FIG. 7 is a diagram of a user interface for use in important notices to the user of the vehicle or other users of related vehicles, according to various embodiments. In one embodiment, the user is alerted by VDE platform 105 of known immediate issues with the vehicle and potential navigation routes. Alert #1 is to notify users of low vehicle tire pressure. This is prioritized as necessary maintenance in order to keep the vehicle in safe driving order. Alert #2 is a notice to determine whether the user wishes to notify others of an accident on the last route taken and potentially synchronize that information with other users taking the same road where the accident was located. To notify other users of the accident event, the user must press the "notify" button on the display. This is prioritized to notify others of the occurrence while it exists, as accidents are generally quickly remedied. Alert #3 is to notify the user of damage to the left side panel of the vehicle as compared against previous images of the vehicle. The damage may then be brought to persons needed to fix the damage. Because damage goes unnoticed when a user does not happen to see it, the notification may be the fastest way resolve damage to the vehicle. Additionally, early knowledge of when such damage occurred may be the best way to figure out when/who caused the damage.

Figure 8:
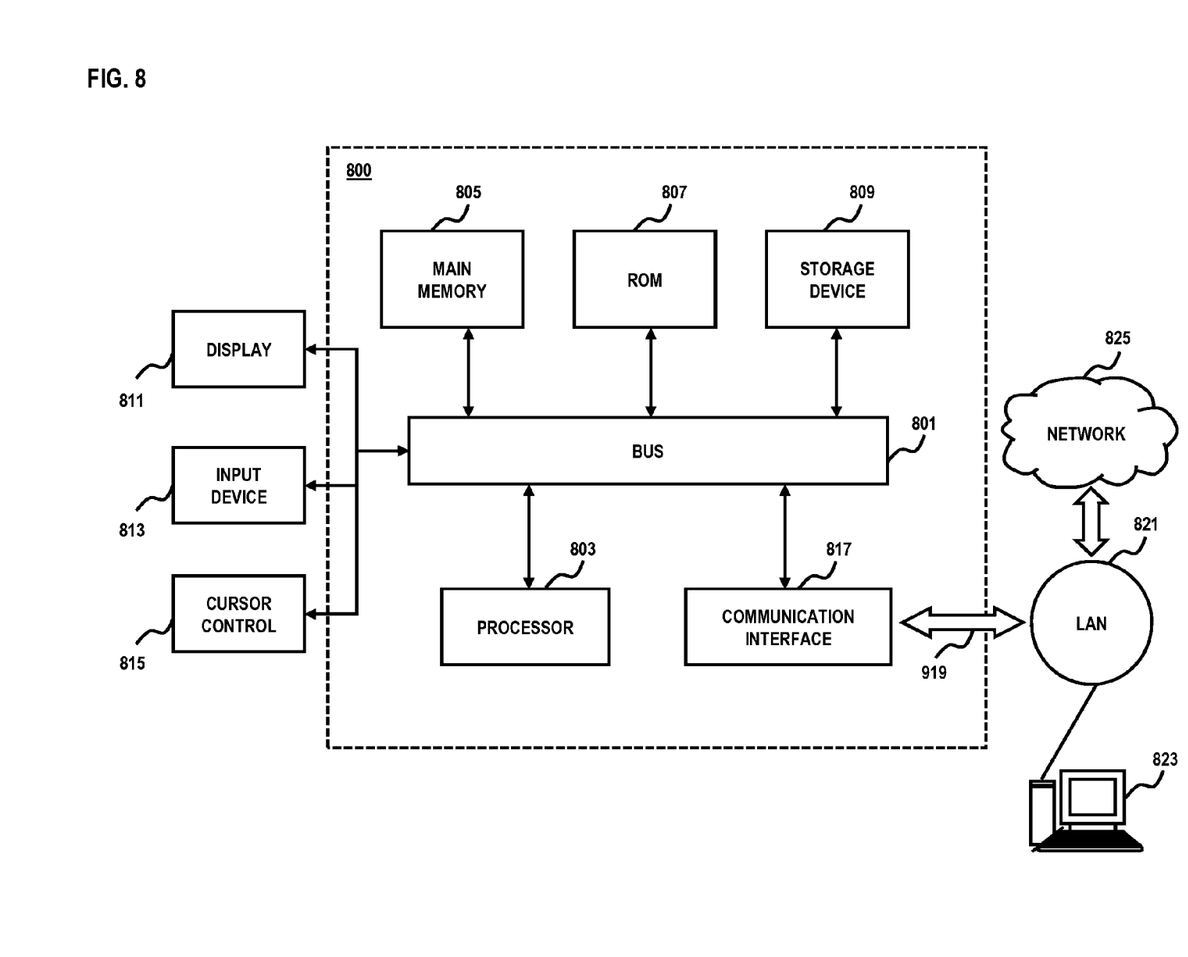
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 901 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
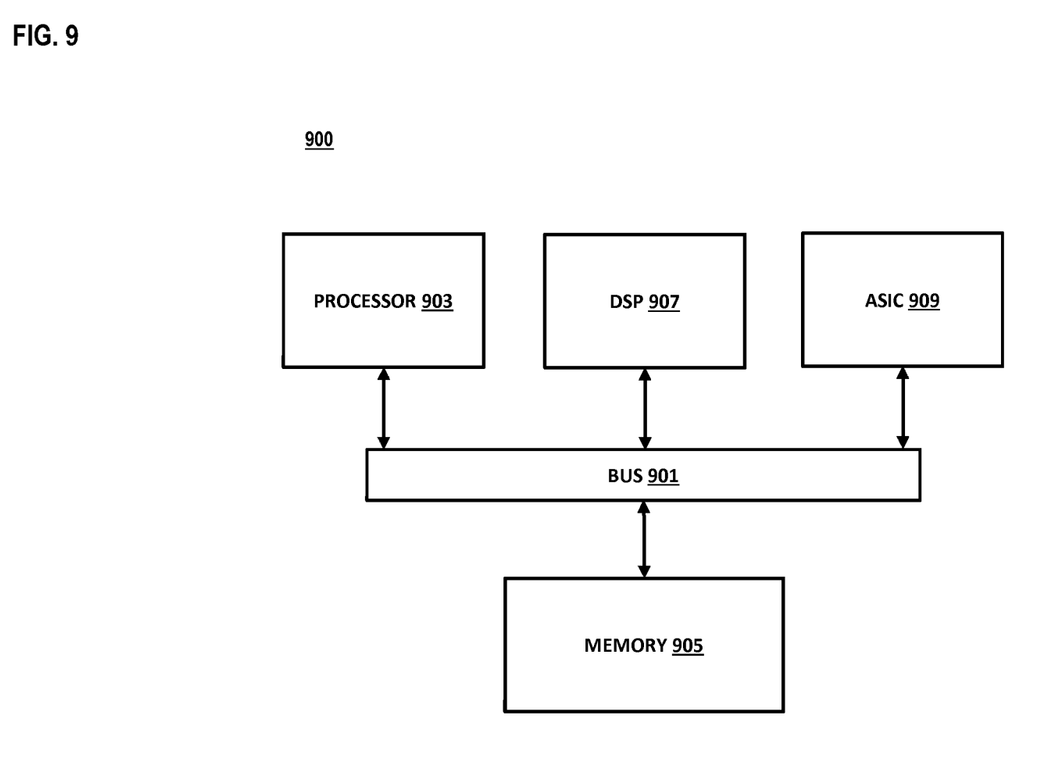
FIG. 9 is a diagram of a chip set that can be used to implement an embodiment of the invention.

FIG. 9 illustrates a chip set 900 upon which an embodiment of the invention may be implemented. Chip set 900 is programmed to provide for implementing a network of cameras for receiving and providing various services and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 3-5.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    determining, by one or more devices, identification information associated with a vehicle;
    querying, by the one or more devices, for sensor location information, data port location information, or a combination thereof for the vehicle based on the identification information;
    detecting, by the one or more devices, a presence of the vehicle within a predetermined space, wherein the vehicle is configured with one or more sensors for collecting sensor data, wherein the one or more sensors include a wired sensor;
    configuring, by the one or more devices, one or more sensor interfaces associated with the predetermined space to retrieve the sensor data from the one or more sensors, the vehicle, or a combination thereof,
        wherein the one or more sensor interfaces are configured to retrieve the sensor data based on the sensor location information, the data port location information, or a combination thereof,
        the configuring including positioning a robotic connection associated with the wired sensor to configure the one or more sensor interfaces; and
    processing, by the one or more devices, the sensor data to determine a storage location for the sensor data.

2. A method of claim 1, further comprising:
    processing the sensor data to determine whether to transmit the sensor data remotely.

3. A method of claim 2, further comprising:
    determining the storage location, whether to transmit sensor data remotely, or a combination thereof based on storage capability information, communication capability information, data priority information, or a combination thereof associated with the vehicle, the predetermined space, the one or more sensors, the one or more sensor interfaces, the storage location, or a combination thereof.

4. A method of claim 1, wherein the storage location includes a local storage location, a cloud storage location, a distributed storage location, or a combination thereof.

5. A method of claim 1, wherein the identification information includes a vehicle profile, a vehicle parking location, or a combination thereof; and wherein the determining of the identification information includes at least one of:
    querying the identification information from a vehicle design database;
    processing image data captured of the vehicle to determine the identification information;
    determining micro-location information to determine the identification information; and
    processing at least a portion of the sensor data to determine the identification information.

6. A method of claim 1, wherein the one or more sensors include a wireless sensor, the method further comprising:
    positioning a wireless antenna associated with the wireless sensor to configure the one or more sensor interfaces.

7. A method of claim 1, further comprising:
    synchronizing the sensor data between the vehicle and another vehicle.

8. An apparatus comprising a processor configured to:
    determine identification information associated with a vehicle;
    query for sensor location information, data port location information, or a combination thereof for the vehicle based on the identification information;
    detect a presence of the vehicle within a predetermined space, wherein the vehicle is configured with one or more sensors for collecting sensor data, wherein the one or more sensors include a wired sensor;
    configure one or more sensor interfaces associated with the predetermined space to retrieve the sensor data from the one or more sensors, the vehicle, or a combination thereof,
        wherein the one or more sensor interfaces are configured to retrieve the sensor data based on the sensor location information, the data port location information, or a combination thereof,
        wherein the processor is further configured to, when configuring the one or more sensor interfaces, position a robotic connection associated with the wired sensor to configure the one or more sensor interfaces; and
    process the sensor data to determine a storage location for the sensor data.

9. An apparatus of claim 8, wherein the apparatus is further configured to:
    process the sensor data to determine whether to transmit the sensor data remotely.

10. An apparatus of claim 9, wherein the apparatus is further configured to:
    determine the storage location, whether to transmit sensor data remotely, or a combination thereof based on storage capability information, communication capability information, data priority information, or a combination thereof associated with the vehicle, the predetermined space, the one or more sensors, the one or more sensor interfaces, the storage location, or a combination thereof.

11. An apparatus of claim 8, wherein the storage location includes a local storage location, a cloud storage location, a distributed storage location, or a combination thereof.

12. An apparatus of claim 8, wherein the identification information includes a vehicle profile, a vehicle parking location, or a combination thereof; and wherein the determining of the identification information includes at least one of:
    querying the identification information from a vehicle design database;
    processing image data captured of the vehicle to determine the identification information;
    determining micro-location information to determine the identification information; and
    processing at least a portion of the sensor data to determine the identification information.

13. An apparatus of claim 8, wherein the one or more sensors include a wireless sensor, and wherein the apparatus is further configured to:
    position a wireless antenna associated with the wireless sensor to configure the one or more sensor interfaces.

14. A system comprising:
    one or more wired sensors for collecting sensor data associated with a vehicle;

one or more sensor interfaces for retrieving the sensor data; and a platform configured to:
  detect, based on the sensor data, a presence of the vehicle within a predetermined space;
  configure the one or more sensor interfaces to retrieve the sensor data from the one or more sensors, the vehicle, or a combination thereof, the configuring including positioning a robotic connection associated with the one or more wired sensors; and
  process the sensor data to determine a storage location for the sensor data.

15. A system of claim 14, wherein the platform is further configured to process the sensor data to determine whether to transmit the sensor data remotely.

16. A system of claim 15, wherein the platform is further configured to determine the storage location, whether to transmit sensor data remotely, or a combination thereof based on storage capability information, communication capability information, data priority information, or a combination thereof associated with the vehicle, the predetermined space, the one or more sensors, the one or more sensor interfaces, the storage location, or a combination thereof.

17. A system of claim 14, wherein the platform is further configured to:
  determine identification information associated with the vehicle;
  query for sensor location information, data port location information, or a combination thereof for the vehicle based on the identification information;
  wherein the one or more sensor interfaces are configured to retrieve the sensor data based on the sensor location information, the data port location information, or a combination thereof.

18. A system of claim 17, wherein the identification information includes a vehicle profile, a vehicle parking location, or a combination thereof; and wherein when determining the identification information, the platform is configured to:
  query the identification information from a vehicle design database;
  process image data captured of the vehicle to determine the identification information;
  determine micro-location information to determine the identification information; or
  process at least a portion of the sensor data to determine the identification information.

19. A method of claim 14, wherein the vehicle is associated with a wireless sensor, wherein the platform is further configured to:
  position a wireless antenna associated with the wireless sensor to configure the one or more sensor interfaces.

20. A method of claim 14, wherein the platform is further to:
  synchronize the sensor data between the vehicle and another vehicle.

\* \* \* \* \*